D. D. BOHANNON.
RESILIENT WHEEL.
APPLICATION FILED OCT. 17, 1918.

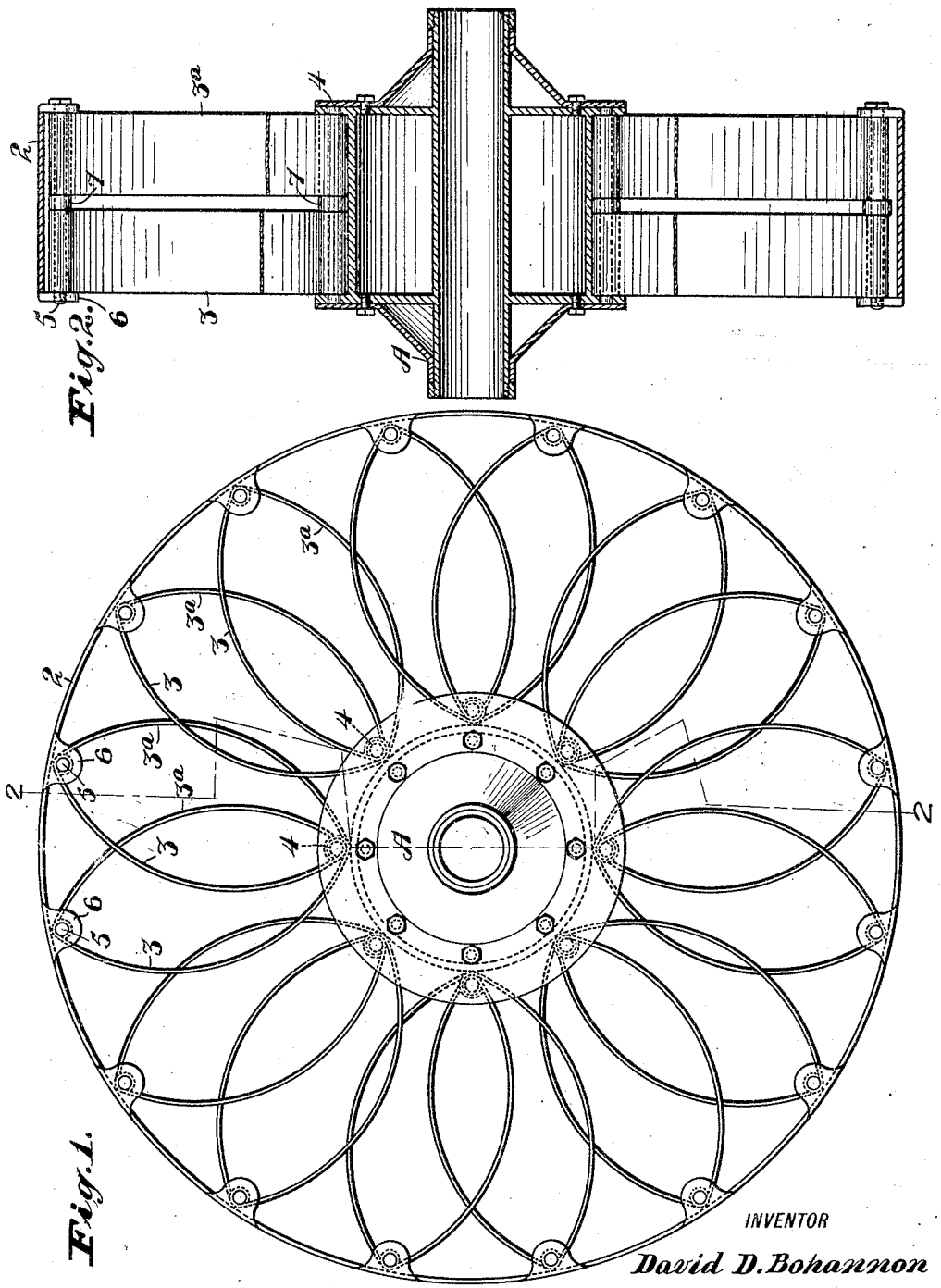

1,345,827.

Patented July 6, 1920.
2 SHEETS—SHEET 2.

INVENTOR
David D. Bohannon
BY
Strong & Townsend
ATTORNEYS

UNITED STATES PATENT OFFICE.

DAVID D. BOHANNON, OF BERKELEY, CALIFORNIA.

RESILIENT WHEEL.

1,345,827.   Specification of Letters Patent.   Patented July 6, 1920.

Application filed October 17, 1918. Serial No. 258,547.

*To all whom it may concern:*

Be it known that I, DAVID D. BOHANNON, a citizen of the United States, residing at Berkeley, in the county of Alameda and State of California, have invented new and useful Improvements in Resilient Wheels, of which the following is a specification.

This invention relates to improvements in resilient wheels, adapted for various purposes but more especially intended for use on aeroplanes and the like.

One of the objects of the present invention is to provide a simple, substantial, resilient wheel which not only employs flexible spring spokes to permit a yielding movement of the hub with relation to the rim or tire but also a flexible rim to further promote resiliency, flexibility and even distribution of the load exerted.

Another object of the invention is to provide a novel form of spring spoke and a mounting therefor, said spring spokes being so disposed between the hub and the rim that the normal load will be carried by the tension or pull of the individual spokes and not by the compression of the same, as is usually the case.

Another object of the invention is to provide a double set of spring spokes arranged in opposition to each other so that a uniform tension and distribution of load may be obtained and turning movement of the hub with relation to the rim prevented. Further objects will hereinafter appear.

The invention consists of the parts and the construction, combination and arrangement of parts as hereinafter more fully described and claimed, having reference to the accompanying drawings, in which—

Figure 1 is a side elevation of the wheel.

Fig. 2 is a vertical cross-section on the line 2—2 of Fig. 1.

Figure 3:
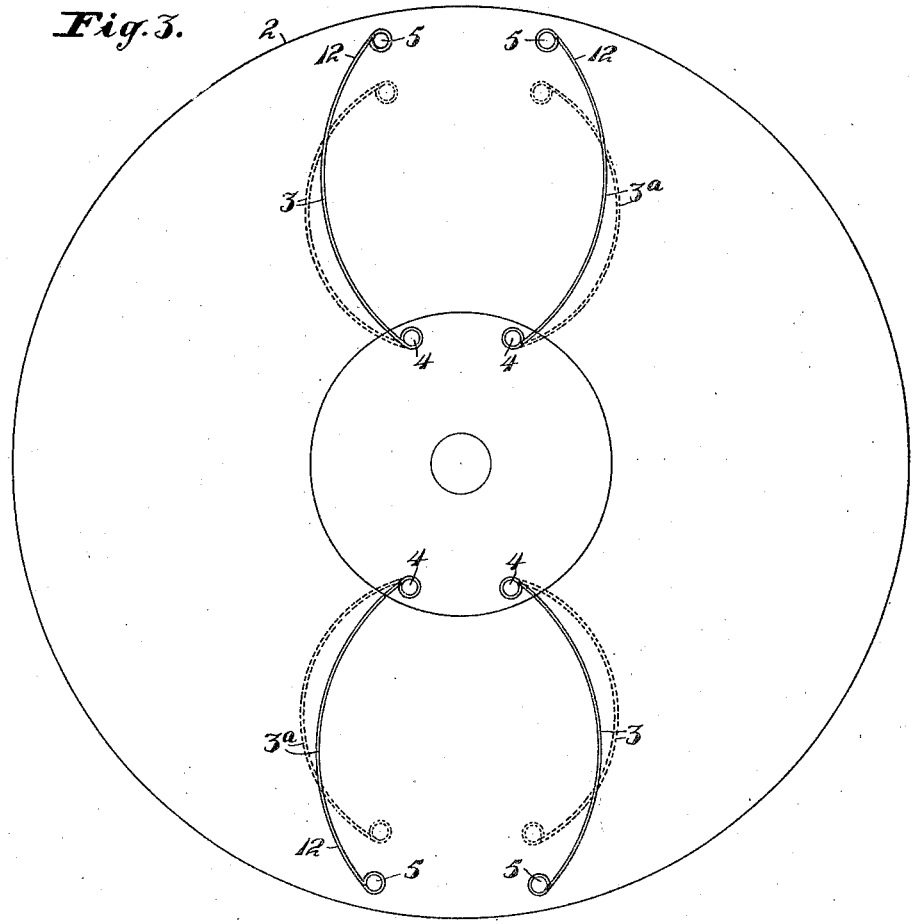
Fig. 3 is a diagrammatic view, showing the method of tensioning the spring spokes.

Referring to the drawings in detail, A indicates the hub of the wheel; 2, the rim; and 3 and 3ª, the spokes. The spokes are arranged in two sets, one set being shown at 3 and the other at 3ª, the spokes 3 being curved in one direction while the spokes 3ª are curved and positioned in opposition to the spokes 3. Each spoke comprises a flat-leaf spring pivotally secured at the inner end to a pin 4 secured in the hub and also pivotally secured at the outer end to a pin 5 secured in lugs 6 carried by the rim.

Figure 4:
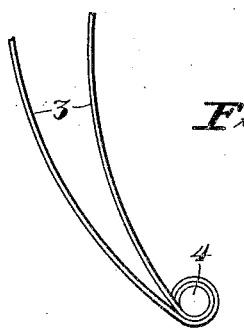
Fig. 4 is a fragmentary view showing the manner of connecting the inner ends of the spring spokes.

There are four springs attached to each hub pin 4 while only two springs are attached to each rim pin 5. This is due to the fact that each set of springs are arranged in pairs, each pair being pivotally attached to the pin 4, as shown in Fig. 4, while the outer end of each pair of springs is attached to separate pins 5 in the rim. It can therefore be seen that there will be four springs on the lower pin and that only two are connected to each rim pin. The spring spokes are separated in any suitable manner, or as here shown by placing washers 7 on the respective pins 4 and 5, and as each set always works in opposition to the other, as far as circumferential thrust is concerned, it will be obvious that there is no tendency to turn the rim with relation to the hub, or vice versa.

One of the main features of the present invention is the provision of a rim which in itself is flexible. This is accomplished by forming the rim 2 of spring steel. The spring steel band forming the rim is in this instance provided with inwardly turned lugs 6 which are formed integral therewith but I wish it understood that said lugs may be otherwise secured, if desired.

Another important feature of the present invention is the method of supporting the hub with relation to the rim. This is diagrammatically illustrated in Fig. 3.

I have determined by experiments and actual practice, that crystallization of a spring will rapidly take place if subjected both to compression and tension and that longevity can be obtained if compression is avoided. I have therefore designed a spring spoke, which, when placed or secured between the rim and hub, will carry the load by the tension or pull exerted thereon and not by compression. This is accomplished by forming the spokes, as shown by dotted lines in Fig. 3. When attaching the same to the rim, it is necessary to open or extend each spoke until the full line position shown at 12, is obtained. It may therefore be stated that each spring or spoke is stretched or extended when inserted.

It can therefore be readily seen that the hub is held in position by the pull of the individual spring spokes and not by the compression of the same. This is of great importance as a spring so inserted will normally bend in one direction, when subjected to ordinary load conditions, and when subjected to abnormal shocks or loads it will still be impossible to compress any individual spring spoke as displacement of the hub with relation to the center of the rim will only tend to further straighten certain spokes while other spokes are moving in normal position or that indicated by the dotted lines in Fig. 3, compression of any spring beyond the dotted line position being practically impossible, as the bending of any spring spoke to the dotted line position will cause the complete straightening of the opposite spring spokes. They will therefore serve as the spokes in a wire wheel and will therefore prevent compression to any extent except when subjected to the most severe shocks, and as such conditions are not often encountered, it will be obvious that compression of any spring spoke will seldom, if ever, take place. Crystallization of the spring spokes is thus avoided and the life of the wheel is correspondingly increased.

The present wheel is particularly suited for aeroplane purposes as it is not only light in weight but it is exceedingly flexible and resilient. The load applied to the wheel is evenly distributed to all the spokes and also to the rim as this in itself is flexible. It is absolutely unnecessary to employ either a solid or pneumatic tire, due to the resiliency of the rim, and the weight of the wheel as a whole can therefore be further reduced.

While a hub and pin connection of specific design and construction is here shown, I wish it understood that these may be varied to suit the wheel or the work it is intended for; similarly that materials and finish of the several parts may be such as the experience and judgment of the manufacturer may dictate.

Another important feature is the provision of a plurality of springs curved one within the other at the hub end. A parabolic curved spring of the character shown will last much longer when one-sixteenth of an inch thick than if it was thicker; for instance, a one-eighth inch spring would crystallize comparatively rapidly while a one-sixteenth inch spring will last almost indefinitely, particularly when working under tension only as previously described. The thin springs placed in pairs, one within the other, provides greater strength than a single one-eighth inch spring and they furthermore provide greater resiliency and a longer life than could otherwise be obtained.

Having thus described my invention, what I claim and desire to secure by Letters Patent is—

1. In a resilient wheel of the character described, a rigid hub having an equally spaced series of transversely placed pins concentrically disposed around the wheel axis, a resilient metal rim concentric with the hub having equally spaced, inwardly extending lugs and pins double in number to those in the hub, and flat leaf, oppositely curved springs extending radially from the hub to the rim in pairs, each pair of springs having their inner ends connected with one of the hub pins and the outer ends connected with adjacent rim pins and having a tensional strain preventing any compression of the springs by road shocks.

2. A wheel including an elastic metal rim having equally spaced, inwardly projecting lugs, a wheel hub having transverse pins supported between external annular flanges formed on the hub and oppositely curved spring spokes in pairs, a pair being connected with one end of a hub pin and a companion pair with the other end of the same pin, the two pairs extending outwardly and having the outer ends of each pair connected with separated adjacent rim lugs and all the pairs of spokes being fixed at their ends so as to provide a continuous tensional strain upon the curved intermediate portions of the springs.

3. In a resilient wheel of the character described, a rigid hub having an equally spaced series of transversely placed pins concentrically disposed around the wheel axis, a metal rim concentric with the hub having equally spaced pins secured on the inner side thereof, said pins being double in number to those in the hub, and flat leaf, oppositely curved springs extending radially from the hub pins in pairs, each pair of springs having their inner ends connected with one of the hub pins and the outer ends connected with adjacent rim pins and having a tensional strain preventing any compression of the springs by road shock.

4. A wheel including a metal rim having equally spaced inwardly projecting lugs, pins carried by the lugs, a wheel hub centrally positioned with relation to the rim, a plurality of pins secured in the hub, said pins being half in number to those carried by the rim, and oppositely curved spring spokes arranged in pairs one on each end of each hub pin, the pairs extending outwardly in opposite directions and having their outer ends connected with separate adjacent rim pins and all the spokes being fixed at their ends so as to provide a continuous tensional strain upon the intermediate portions of the individual spokes.

In testimony whereof I have hereunto set my hand in the presence of two subscribing witnesses.

DAVID D. BOHANNON.

Witnesses:
W. W. HEALEY,
M. E. EWING.